Sept. 12, 1933.    P. ERWIN    1,926,478
ELECTRIC AUTOMOTIVE STEERING MECHANISM
Filed Nov. 11, 1932    3 Sheets-Sheet 2
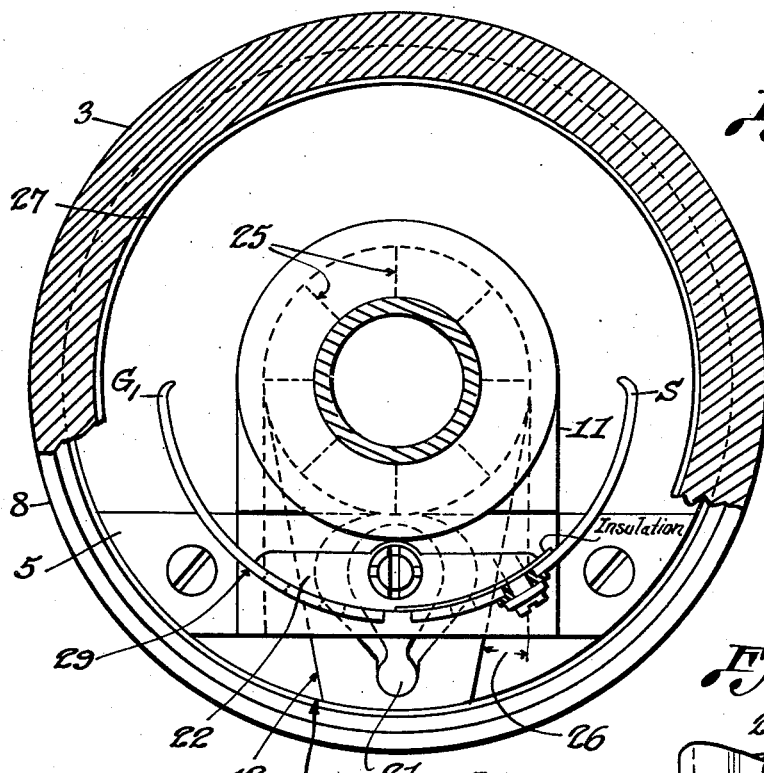
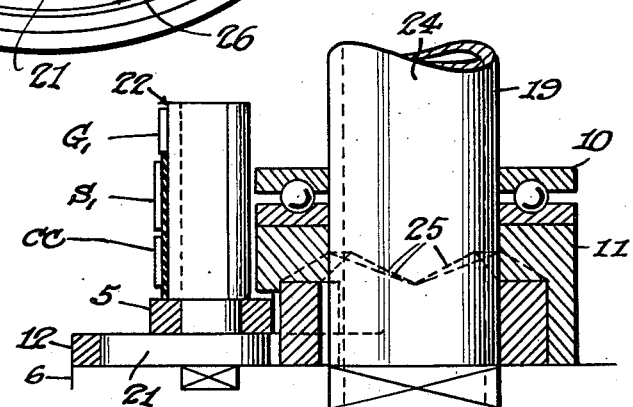
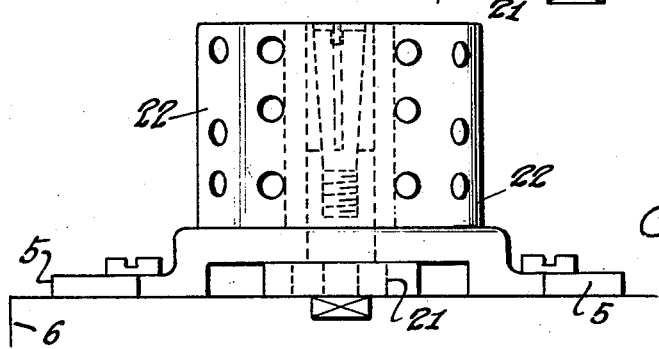

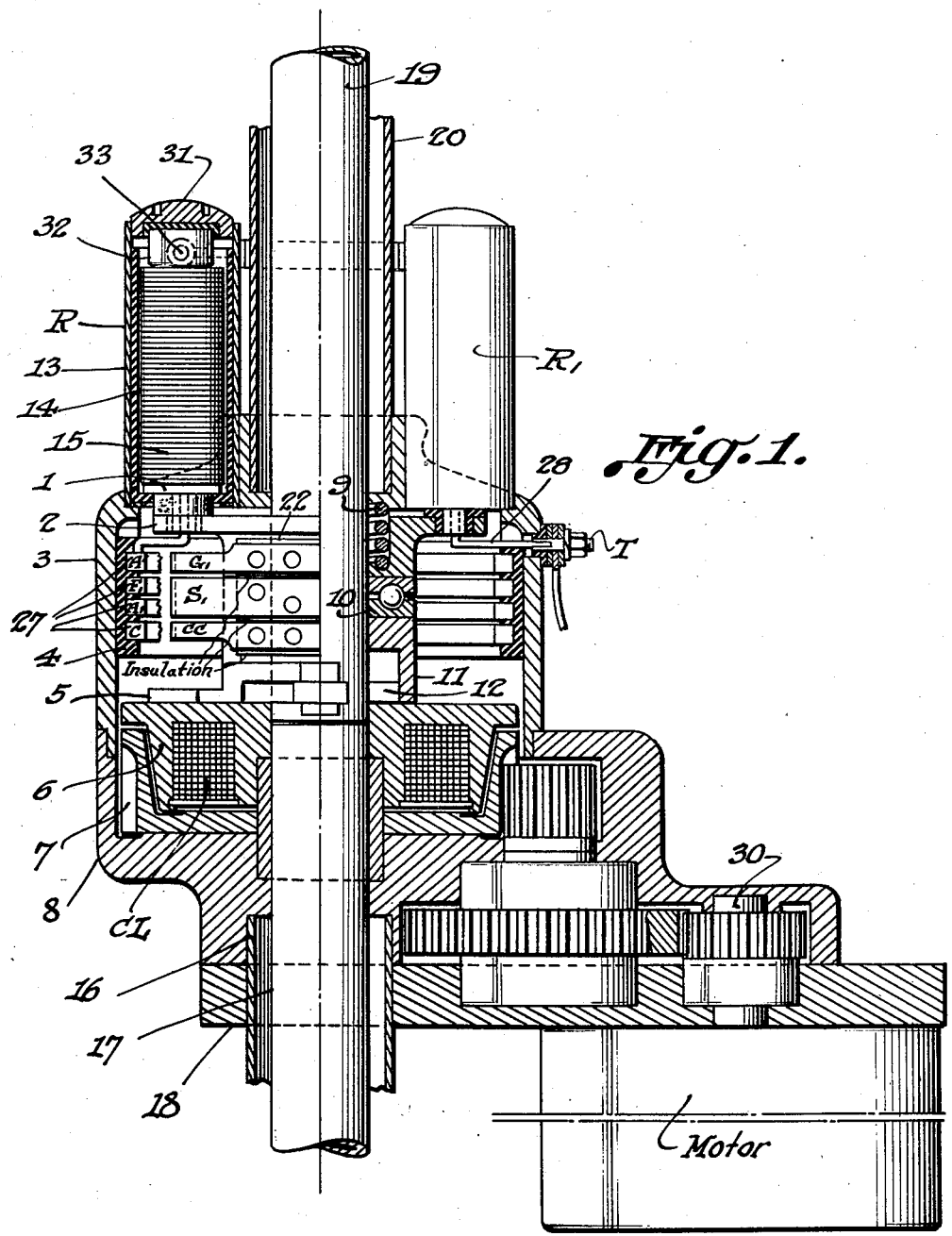

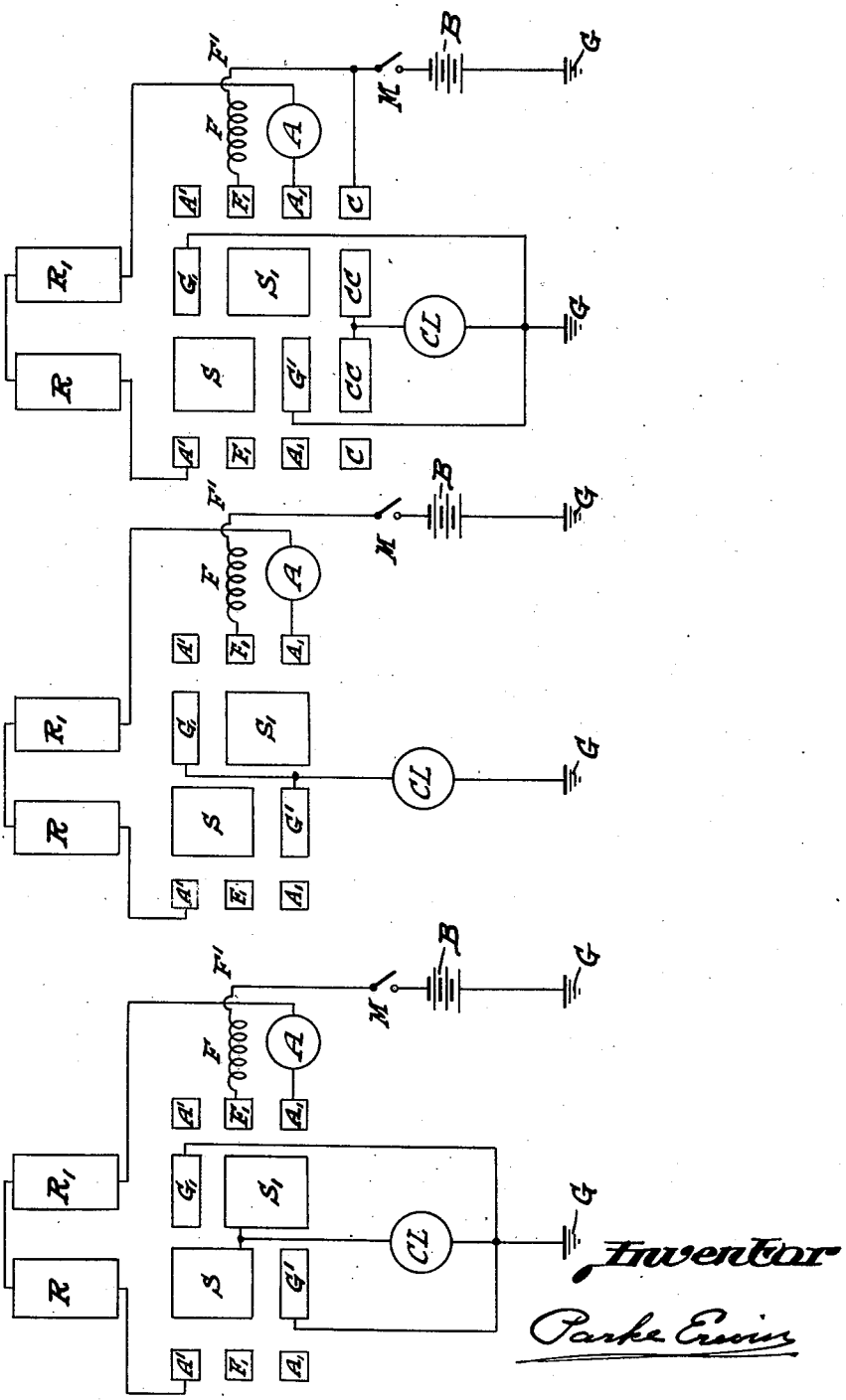

UNITED STATES PATENT OFFICE 1,926,478

ELECTRIC AUTOMOTIVE STEERING MECHANISM

Parke Erwin, Massena, N. Y.

Application November 11, 1932
Serial No. 642,250

7 Claims. (Cl. 172—8)

My invention relates to improvements in electric steering mechanisms for motor propelled vehicles, in which mechanisms the movement of the steering wheel or lever by the operator, causes a steering motor to do all or a portion of the work of steering.

One object of my invention is to provide in a compact unit, a power steering mechanism which may either be incorporated in a new power vehicle, or readily built into an existing one.

Another object is to apply the power and its control in such a manner that the power feature may be instantly rendered inoperative, and when in such condition will offer no resistance to the normal manual control of steering.

Another object is to so control the motor that its direction, speed, and power, will respond immediately to the movement and pressure exerted by the operator upon the steering wheel.

Another object is to provide a practical method of making the necessary electrical contacts between stationary and moving parts.

I shall explain other objects attained in the description which follows:

In the accompanying drawings:—

Fig. 1 is a vertical elevation of the mechanism partly in section.

Fig. 2 is a plan view of the interior of the control housing.

Fig. 3 is a detail elevation of the contractor and its mounting in the same plane as Fig. 1.

Fig. 4 is a detail elevation of control parts looking from the right side of Fig. 2.

Figs. 5—6—7 are three wiring diagrams, showing the possible circuits that may be used in this mechanism.

I do not intend to limit the application of this mechanism to automobiles; nor do I limit the method of carrying out the principles of this invention to the particular construction shown and described herewith. I have chosen, however, to describe one form of this mechanism as designed for automobile use, this being characteristic of any other construction embodying the same principles.

In the present day conventional manually operated steering mechanism on a motor vehicle, a steering wheel turns a steering column which operates a worm and sector or other type of gearing arranged to move the guiding means of the vehicle.

In the construction shown by attached drawings, this steering column is cut in two at any convenient point, preferably near the cowl; the two ends thus formed being guided and maintained in alignment by a housing (here comprised of three parts, 3—8 and 18) which is securely fastened to the cowl or other convenient point, possibly replacing the bracket which is usually found at this location serving to support the stationary column within which the steering column rotates. A section of the stationary column at this point, between 16 and 20, is necessarily removed, the housing 3—8—18 replacing it. 17 is the lower portion of the severed steering column, and will here be called the steering shaft; while 19 is the upper portion of said column, and will here be called the "steering member" to which the steering wheel is attached.

Upon steering shaft 17, and within housing 3—8, is securely and concentrically fastened the driven clutch member 6 which is constructed of soft iron so that it will quickly lose its magnetism; but has a guiding hub of bronze or other non magnetic material. Within this clutch member 6 and surrounding the iron hub of same, is the energizing coil CL.

Underneath and concentric with 6 is the iron mating and driving clutch member 7 having an internal conical face surrounding the external conical face of 6; but entirely separated from same in its disengaged position. It is shown held in this position, that is, seated upon case 8, by its own weight; but in some designs, a spring may be used when necessary between 6 and 7 to assure their disengagement.

Steering shaft 17 with driven clutch 6 is therefore free to turn when disengaged from 7. When clutch coil CL is energized, 7 is attracted by 6, and raised slightly from its seat on 8 until the conical faces of 6 and 7 are in contact. In this position the clutch is engaged, this engagement being sufficiently strong to transmit the power necessary to turn 17 and thus effect the steering of the vehicle.

Driving clutch member 7 may be driven by a motor through any type of gearing. I here show a reduction train of spur gears between the electric motor on center line 30 and clutch member 7 which itself is the final gear in the train. This arrangement allows the motor to be hung from the housing 18 vertically, with its center line 30 parallel to steering shaft 17, thus occupying a position in back of the cowl in which location it is quite well concealed. It is desirable that housing 3—8—18 be made of aluminum or other non-magnetic material, especially that portion of it 8 upon which driving clutch member 7 rests.

To effect the control of motor and clutch I employ, as is customary in some other power steering mechanisms, a small free angular motion between steering member 19 and steering shaft 17. Upon the end of 19 adjacent to 6, an arm 12 is fastened and allowed to rotate with 19 through an angle 26 in either direction from its normal central position with respect to 6, before being stopped by a limiting member 5 integral with 6. It is evident that the steering wheel, steering member 19, and arm 12 may be turned through this angle 26 in either direction from normal without turning 17; but if turned farther, will also turn 17 if clutch 6—7 is disengaged, thus manually effecting the steering of the vehicle.

It is desirable that the steering which requires little effort be done by hand without requiring the steering motor to function. This object is attained by the use of a spring device, acting between 12 and 6, tending at all times to maintain arm 12 in its normal central position relative to 5 and 6, and to return it to this position whenever it is rotated therefrom. Thus 12 when rotated, will rotate 6 with it, unless the resistance offered to steering by 6 is greater than the resistance offered by the spring device to the rotation of 12 relative to 6.

This is accomplished as follows: Pressure collar block 11 surrounds and rests upon the hub of 12. It is free to rise, but is prevented from turning relative to 6 by a flat side in contact with 5. Pressure collar 2 rests upon 11 with suitable thrust bearing 10 between, and is also free to rise but non-rotatable. A suitable spring 9 between housing 3 and pressure collar 2, tends to prevent 2 and 11 from rising. The lower surface of 11 and the upper surface of 12, these two surfaces being in contact, have inclined thrust surfaces 25 so arranged that when 12 is rotated in either direction, it will lift 11 vertically. When lifted vertically, the pressure applied on top of 2 by spring 9 tends to lower 11 into its normal position, and to rotate 12 back into its normal central position relative to 5 and 6. As 11 is lifted by 12, and returned by 9, so are the thrust bearing 10 and pressure collar 2. All three, 2, 10 and 11, slide freely up and down together. Since the strength of spring 9 determines the pressure that must be applied to the steering wheel to rotate 12 relative to 6, and thus actuate the power steering controls, this spring may be changed to give any pressure desired, or may be adjustable by a suitable nut between the top of 9 and the housing 3.

To make use of angular motion 26; a contactor 22 having a contactor arm 21 is pivotally mounted substantially as shown, arm 21 extending into a depression in arm 12 in such a manner that when 12 rotates it will rotate 22 through a greater angle than its own. In this connection 12 is essentially a sector of an internal gear and 21 the tooth of a pinion meshing with it. Attached to 22 are contactor brushes 29 arranged as in Figs. 5—6 or 7 depending upon which method of control is desired. The effect of rotating arm 12 with respect to 6 is to move contactor brushes 29 outward toward the inside periphery of housing 3, upon which are mounted contact rings 27, insulated from 3 and from each other by insulating ring 4. Each ring, $F_1$—$A^1$—$A_1$ (and C if used), has a terminal similar to T, extending through 3 for making the necessary electrical connections. Ring $A^1$ is connected to lower resistance contact 1 of control resistance R; and the corresponding lower resistance contact of $R_1$ is connected by a flexible conductor to a terminal T.

R and $R_1$, each consist of a resistance case 13, an internal insulating tube 14, a series of graphite or other resistance discs 15, a lower resistance contact 1, an upper resistance contact 32 and a pressure adjustment 31. The upper resistance contacts 32 are connected by a conductor 33, thus putting R and $R_1$ in series in the motor circuit as shown in Figs. 5—6—7. Both the upper and lower resistance contacts 1 and 32 are insulated from the case and from pressure collar 2. As 2 is lifted by 11 and 12, it presses the discs in R and $R_1$ tighter together, thereby decreasing their resistance, and allowing more current to pass. The use of compression resistances for controlling current in a circuit is well known.

The operation of this controller is as follows: When steering wheel with 19 and 12 is turned, 17 will turn with it unless the resistance offered by 17 is enough to cause spring 9 to compress. In this case 12 will move ahead of 6 through part of the angle 26, the amount depending upon the resistance offered by 17. The distance between brushes 29 and rings 27 allows some free angular motion between 12 and 6 for manual steering before brushes 29 come in contact with rings 27. This distance, together with the strength of spring 9, determines what manual pressure is necessary upon the steering wheel before power steering is effected. When this pressure is exceeded, 22 will have been rotated sufficiently to bring contacts 29 against rings 27, thus completing the necessary circuits as shown in Figs. 5—6 or 7, to energize the clutch and cause the motor to turn the clutch in the same direction as that in which the steering wheel is turning. The clutch is immediately fully energized, and the motor circuit closed, simultaneously. However, the motor circuit is closed through the resistances R and $R_1$, therefore the speed and torque of the motor which vary with the amount of current supplied to it, will depend upon the amount of resistance in R and $R_1$, which resistance will decrease when pressed upward by 2 which in turn receives its upward pressure through 19 from the steering wheel. It follows that the greater the rotative pressure upon the steering wheel, the greater will be the torque and speed of the motor. R and $R_1$ can be adjusted by 31 for any initial current from zero to maximum, to suit the speed and power desired by the operator.

Now, if the steering wheel is stopped, the motor will continue to turn through that part of the angular motion 26 necessary to break contact between 27 and 29. This contact will also be broken by spring 9 returning 12 to its normal central position relative to 6 should the operator's hands be removed from the steering wheel.

If the steering wheel is held stationary, and 17 tends to turn sufficiently to bring brushes 27 and rings 29 together, the circuit will be completed in the proper direction in any case to cause the motor to oppose the rotation of 17.

It should be noted that brushes 29 are spring connected to contactor 22. This is necessary, since the ends of brushes 29 are brought into contact with rings 27, before 12 has rotated through all of angle 26 with respect to 6. At this stage, although 29 and 27 have completed their contacts, pressure collar 2 will have been raised only enough to put slight pressure upon discs 15. It must be possible, therefore, for 12 to continue its rotation relative to 6 in order to transmit the desired pressure to discs 15. The flexibility of 29 or their connections to 22 (in this case 29 are, themselves, constructed of flat spring brass) allows the completion of this angular motion 26.

At the moment of making or breaking contact between 29 and 27, the current flowing in the motor circuit is at, or near, a minimum; since pressure on discs 15 is at this time near a minimum, and may actually be adjusted by 3, if desired, to be zero as before pointed out. Therefore any sparking or burning of 29 and 27 at points of contact during the breaking operation is prevented.

Now, these various relations above described between 17 and 19, effecting the control of the mechanism, take place regardless of their position rotatively in respect to housing 3—8 and 18, since brushes 29 can make contact with rings 27 at any point on their circumference, and will remain in contact, being drawn along upon said rings with a wiping motion, as the rotation of 17 and 19 with respect to 3—8 and 18 continues, through any number of degrees. Since brushes 29 are drawn along on rings 27 (not pushed along), with a wiping paint brush action, the contact is smooth and without chatter.

Also, pressure upon 15 through 2 is maintained regardless of the position of 19 rotatively in respect to 3—8 and 18.

Pressure collar spring 9 in addition to its function of keeping 12 centrally located with respect to 5 and 6, also performs the important work of immediately releasing pressure upon 15 as 12 returns to its normal central location relative to 6 from either direction.

In the wiring diagrams, Figs. 5—6 and 7, the motor circuit control is shown the same in each case, but the clutch control is different. Fig. 5 shows the clutch coil CL in parallel with the motor armature A, and by interchanging A and F, it will be in parallel with the motor field F. In Fig. 6 the clutch coil CL is shown in series with both field and armature. In Fig. 7 clutch coil CL is shown on an independent circuit. In this arrangement Fig. 7 the motor current has no direct effect upon the current flowing in CL as it does in the circuits of Figs. 5 and 6, although this circuit requires an additional contact ring C, and two additional contactor brushes CC. Any of these circuits are workable in this mechanism. One terminal of CL is grounded to 6 in each case, the other terminal is flexibly connected to insulated brushes S and $S_1$, in Fig. 5; to insulated brushes $G^1$ and $G_1$, in Fig. 6, and to insulated brushes CC, in Fig. 7. Contactor 22 being in contact with 5—6—8—16—17 and then to the vehicle frame, is grounded, one terminal of battery B being similarly grounded. Contactor brushes $G^1$ and $G_1$, in Figs. 5 and 7, being attached to 22 are also grounded, therefore when they touch rings $A_1$ and $A^1$, these rings will be grounded. S and $S_1$, are insulated from 22, and serve merely to connect $A^1$ to $F_1$, or $A_1$ to $F_1$, when they touch these rings.

M is an electric switch of any type, conveniently located so that the operator may instantly break or make the circuit, thus rendering the power feature of the mechanism inoperative or operative at will. To follow out one circuit, that of Fig. 7, assume contactor 22 rotated so that S touches rings $A^1$ and $F_1$; $G^1$ touches $A_1$, and CC touches C; then current will flow from B through M (closed), to C, to CC, through CL, to G, back to B, thus energizing clutch 6. Also current will flow from B through M (closed), through F (motor field), to $F_1$, to S, to $A^1$, through R—$R_1$ to A (motor armature), to $A_1$, to $G^1$, to G, back to B, thus causing the motor to rotate in one direction. Now, if 22 is rotated in the opposite direction, the clutch circuit will be similar; but the motor circuit after leaving F will pass from $F_1$ to $A_1$ through $S_1$ instead of to $A^1$ through S, and then through A in the opposite direction, thus reversing the direction of flow in A only, and thus reversing the motor. That this direction of rotation may be correct to rotate 17 in the same direction in which 19 is turning, the leads from either A or F may be reversed as required in making the initial connections between motor and terminals T.

I am aware that electrical steering devices have been designed with the idea of utilizing the movement of the steering wheel to energize a steering motor. I therefore do not claim such a combination broadly, but

I claim:

1. The combination in an electrical steering device for motor propelled vehicles having a guiding means, of:—a steering shaft for operating said guiding means; a driven member of a magnetic clutch attached to said shaft; an electric steering motor and source of power for same, with suitable reduction gearing between said motor and the driving member of a magnetic clutch, said clutch being the means, when engaged, of operatively connecting steering motor and steering shaft; a steering wheel arranged to rotate said steering shaft manually without moving the steering motor or any gearing connected with same, and having a limited free angular movement with respect to steering shaft; a means for utilizing said angular movement to control the speed and torque of steering motor through the manipulation of suitable contacts and a compression resistance in the steering motor circuit; a means for utilizing said angular movement to energize the magnetic clutch; a means for utilizing said angular movement to properly energize the steering motor so that it will rotate in the direction desired; a means for conducting electrical energy from the stationary to the movable contacts.

2. In an electrical steering device for motor propelled vehicles having a guiding means:—a steering shaft for operating said guiding means; an electric motor for operating said steering shaft; a magnetic clutch for operatively connecting said motor and said steering shaft; a steering wheel fastened to a steering member concentric with steering shaft, and having a limited free angular movement with respect to same; a motor control arranged to be operated by said angular movement; a radial arm securely fastened to said steering member, said arm normally central between two stops upon the driven clutch member of the steering shaft, but with limited space between each side of said arm and its limiting stop, thus allowing a rotative movement of said arm through a limited angle in either direction before solidly engaging the corresponding stop, and causing the steering shaft with driven clutch member and stops to rotate as a unit with steering wheel, steering member, and arm, through any continued movement of steering wheel in that direction; said arm being normally held central between said stops by spring pressure substantially as described.

3. In an electrical steering device for motor propelled vehicles having a guiding means:—a steering shaft for operating said guiding means; an electric motor for operating said steering shaft; a circuit for supplying power to said motor; a steering wheel rotating a steering member for operating the circuit controls as well as for the manual operation of the steering shaft, a means for controlling the speed and torque of said motor; said means consisting of a compression resistance disposed in said motor circuit with means for transmitting the pressure applied in turning the steering wheel to the compression resistance, thus compressing same, thereby increasing the current in the motor circuit; means of adjusting the normal initial compression of said resistance so that initial current flowing in the motor circuit may vary from zero to maximum.

4. In an electrical steering device for motor propelled vehicles having a guiding means:—a steering shaft for operating said guiding means; an electric motor for operating said steering shaft; a magnetic clutch for operatively connecting said motor to said steering shaft; a steering wheel mounted upon a steering member concentric with steering shaft and arranged to rotate the steering shaft manually but having a limited free angular movement with respect to same; a contactor arranged to be rotated by said free angular movement, a stationary housing enclosing the magnetic clutch and other moving parts of the steering device; a series of contact rings upon the inside periphery of said housing, said rings being insulated from the housing and from each other, and being concentric with clutch and steering member of steering wheel; insulated terminals connected to said rings for connecting rings to the outside circuits serving motor, compression resistance, and clutch, a rotation of contactor relative to steering shaft functioning to short or ground the proper rings as required to complete the proper circuits for operating clutch and motor.

5. In an electrical steering device for motor propelled vehicles having a guiding means:—a steering shaft for operating said guiding means; an electric motor for operating said steering shaft; a circuit for supplying power to said motor, a steering wheel for controlling the motor; a stationary housing enclosing the moving parts of the device; one or more resistance cases attached to said housing, each case having a suitable insulation lining, a multiplicity of resistance discs stacked in each case, the end disc in each stack being electrically connected with the motor circuit through a movable contact in such a way that said stack forms a part of the circuit, one of which contacts is a pressure member for transmitting to the stack, pressure received from the steering wheel through a differential movement between said wheel and steering shaft; the other contact being independently adjustable to vary the initial pressure on its stack from zero to maximum required.

6. In an electrical steering device for motor propelled vehicles having a guiding means:—a steering shaft for operating said guiding means; an electric motor for operating said steering shaft; a magnetic clutch for operatively connecting said motor to said steering shaft; a steering wheel arranged to rotate said steering shaft manually; a steering member rotated by said steering wheel and having an arm attached to said member, said arm having a limited free angular movement with respect to steering shaft; a stationary housing enclosing the moving parts of the device, and having contact rings suitably disposed upon its inside periphery; a contactor pivotally mounted upon driven clutch member of steering shaft, between the center and circumference thereof, and having a tooth extending radially toward the circumference of said clutch member and meshing with a suitable depression in the arm of the steering member, the limited free angular movement of said arm relative to clutch member thereby producing a greater angular movement of the contactor in the same direction; suitable contactor brushes, spring connected to said contactor, and insulated from same when necessary, a rotation of the steering wheel thus rotating the contactor in the same direction, and, before reaching the end of its free angular motion with respect to the driven clutch member of the steering shaft, forcing the contactor brushes out against their respective contact rings on the inside of the housing, further rotation of steering wheel and steering shaft as a unit causing the contactor brushes to wipe around upon the contact rings, maintaining contact at any point on their circumference until released by opposite angular movement between steering wheel and steering shaft; said contactor brushes being sufficient in number and so connected in the circuit as to simultaneously energize the steering motor and the magnetic clutch.

7. In an electrical steering device for motor propelled vehicles having a guiding means:—a steering shaft for operating said guiding means; an electric motor for operating said steering shaft and a circuit for supplying power to same; a steering wheel; a steering member rotated by said steering wheel, and having a limited free angular movement in respect to steering shaft; a stationary housing enclosing the moving parts of the controller, one or more resistance units suitably held by said housing, these resistance units being electrically connected in above circuit for the purpose of controlling same, and arranged so that pressure may be transmitted to them from the steering wheel through a differential movement between said wheel and steering shaft; a fixed collar attached to said steering member; a sliding collar in contact with and above said fixed collar, held from rotating with respect to adjacent steering shaft by suitable means; suitable inclined plane depressions and meshing projections upon the contacting faces of said collars so that an angular movement of the fixed collar in either direction from its normal position relative to steering shaft, will cause the sliding collar to slide upwards along the steering member; a sliding pressure member resting upon the sliding collar, and non-rotatable, and having its upper surface in mechanical contact with the insulated pressure members of the compression resistances; a rotation of the steering wheel, steering member and fixed collar through any part of their free angular motion relative to the steering shaft, thereby raising the sliding collar and sliding pressure member, thus exerting pressure to compress the resistance in the resistance units; thereby decreasing their resistance, and thus increasing the current flowing in their circuit, and correspondingly increasing the speed or torque of the motor; a suitable spring between the housing and the sliding pressure member functioning to return said member to its lowest position, and tending by the pressure it exerts between the before mentioned inclined planes of the two collars, to return the steering wheel member with fixed collar and arm to its normal angular position relative to steering shaft.

PARKE ERWIN.